(12) United States Patent
Naruse

(10) Patent No.: US 6,324,753 B1
(45) Date of Patent: Dec. 4, 2001

(54) MOUNTING ASSISTANCE DEVICE

(75) Inventor: Yutaka Naruse, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/593,708

(22) Filed: Jun. 15, 2000

(30) Foreign Application Priority Data

Jun. 22, 1999 (JP) .................................. 11-175610

(51) Int. Cl.[7] .................................................. B23P 19/04
(52) U.S. Cl. .................. 29/821; 29/894.3; 29/894.31; 157/16; 157/17; 157/18; 157/21; 269/236; 269/243; 301/5.21
(58) Field of Search ............................ 29/468, 821, 894, 29/894.3, 894.31, 894.321, 406; 269/87.2, 203, 236, 243; 301/5.21; 157/14, 16, 17, 18, 21

(56) References Cited

U.S. PATENT DOCUMENTS

| | | | |
|---|---|---|---|
| 160,960 | * | 3/1875 | Rydbeck ............................... 269/150 |
| 1,016,914 | * | 2/1912 | Christiana ............................... 269/51 |
| 2,792,139 | * | 5/1957 | Llyod ................................... 414/428 |
| 2,852,151 | * | 9/1958 | Smith ................................... 414/428 |
| 5,226,465 | * | 7/1993 | Schon et al. ......................... 157/1.28 |
| 5,946,797 | * | 9/1999 | Kawabe et al. ......................... 29/821 |
| 6,079,703 | * | 6/2000 | Chavez, Jr. ............................ 269/147 |
| 6,116,588 | * | 9/2000 | Yamane ................................. 269/228 |
| 6,158,730 | * | 12/2000 | Coffey .................................. 269/236 |
| 6,249,954 | * | 6/2001 | Kawabe et al. ......................... 29/468 |

FOREIGN PATENT DOCUMENTS

| | | | | |
|---|---|---|---|---|
| 2329577 | * | 5/1977 | (FR) | ................ B66C/1/68 |
| 597312 | * | 1/1948 | (GB) | .................... 269/236 |
| 7-228102 | | 8/1995 | (JP) . | |
| 1537437 | * | 1/1990 | (SU) | ..................... 29/821 |
| 1639938 | * | 4/1991 | (SU) | ..................... 29/821 |
| 1771918 | * | 10/1992 | (SU) | ..................... 29/821 |

* cited by examiner

Primary Examiner—S. Thomas Hughes
Assistant Examiner—Essama Omgba
(74) Attorney, Agent, or Firm—Sughrue, Mion, Zinn, Macpeak & Seas, PLLC

(57) ABSTRACT

A mounting assistance device with which a vibrating device can be efficiently mounted to a tire and wheel assembly. In the mounting assistance device, abutting portions are made to abut against sidewall portions of a tire and then an eccentric disc is pressed against a sliding portion so as to be united therewith by lowering a lever of a handle member in a first direction. In this state, when the lever is rotated 180° about a pin member in a second direction, due to an effect of the eccentric disc, clamping members move in a mutually approaching direction. Accordingly, clamping and fixing to the tire is accomplished by the mounting assistance device. Thus, the mounting assistance device (and vibrating device) can be mounted without using tools, simply by rotating the lever in the two directions.

18 Claims, 8 Drawing Sheets

MOUNTING ASSISTANCE DEVICE

BACKGROUND OF THE INVENTION

1. Field of the Invention

The present invention relates to a mounting assistance device of a tire and wheel assembly, and more particularly, to a mounting assistance device of a tire and wheel assembly to accurately align a center of rotation of the assembly with an axle of an automobile when mounting the tire and wheel assembly onto the axle of the automobile.

2. Description of the Related Art

In an operation for mounting the tire and wheel assembly (which may be referred to simply as an assembly hereinafter) to the axle of a vehicle, it is vital to make the center of rotation of the tire and wheel assembly coincide with a central axis of the axle of the vehicle.

However, in this mounting operation, a moment, which tends to move a center of gravity of the assembly downwards from a center of rotation of the axle of the vehicle, always acts because of factors such as the assembly being heavy, the center of gravity of the assembly being offset toward an outside of the vehicle, and the like. As a result, the axle of the vehicle may not coincide with the center of rotation of the assembly and the assembly may end up being mounted to the axle of the vehicle in an eccentric state.

If the vehicle is run with the center of gravity of the assembly being eccentric as described above, because vibrating forces act on the vehicle from unsprung parts, vibration is generated and the tire is unevenly worn.

As a mounting method for avoiding the above-described drawbacks, there has been conventionally used a method in which the assembly is rotated while the tire thereof is tapped, diagonal pairs of one of mounting nuts and wheel bolts are successively tightened little by little until the one of nuts and bolts are not loose, and then final tightening thereof is carried out with a torque wrench.

However, this method depends to a large extent on levels of skill of operators and is not generic.

The present applicant has suggested a mounting assistance device, with which variations between operators are suppressed and an assembly is mounted to the axle of the vehicle with high accuracy without the assembly being caused to be eccentric, and a method thereof (Japanese Patent Application Laid-Open (JP-A) No. 7-228102). As illustrated in FIG. 8, in a mounting assistance device 2, clamping members 8 and 10 abut against both side surfaces (sidewall portions) of a tire 6 of an assembly 4, and a nut 11 is tightened. As a result, an eccentric disc 12 cannot move in directions X with respect to the clamping member 10. When a handle 14 is rotated, the clamping member 8 and the clamping member 10 are caused to approach each other by a cam action of the eccentric disc 12 thereby clamping the tire 6. In this state, rotation of the eccentric disc 12 is disabled by a nut 16. Accordingly, a tightened state is locked so that a fixed state is securely maintained.

Vibration is applied to the assembly 4 in the above-described state by a vibrating device 18. Vibration of the assembly 4 acts to offset eccentricity of the center of rotation of the assembly 4. Accordingly, even if an operator is not skilled, the operator can mount the assembly to the axle of the vehicle with high accuracy by further tightening the one of hub bolts and nuts while vibrating the assembly.

However, when the mounting assistance device 2 is mounted to the assembly 4, it is necessary to use a tool to tighten the nuts 11 and 16 to fix the eccentric disc 12 to the clamping member 10 and to maintain the tightened state, which is complicated. Accordingly, it has been desired that the mounting operation of the mounting assistance device 2 (the vibrating device 18) should be carried out more efficiently.

SUMMARY OF THE INVENTION

The present invention is provided to solve the above-described problems and an object of the present invention is to provide a mounting assistance device which can efficiently mount a vibrating device to a tire and wheel assembly.

In order to accomplish the object, in a first aspect of the present invention, a mounting assistance device which clamps a tire-and-wheel assembly from both side surfaces thereof and vibrates the assembly comprises a first clamping member and a second clamping member for clamping the both side surfaces of the assembly; a first abutting portion and a second abutting portion which are portions of the first clamping member and the second clamping member respectively, and which abut against the side surfaces of the assembly, and which face each other with a distance therebetween which can be adjusted; a vibrating device which is fixed to one of the first clamping member and the second clamping member; a first eccentric member which is rotatably disposed at the second clamping member so as to abut against the first clamping member and is urged onto the second clamping member such that the first eccentric member moves integrally with the second clamping member; a first lock mechanism for fixing the first eccentric member to the second clamping member; and a handle member which enables an operation for fixing the first eccentric member to the second clamping member via the first lock mechanism, and enables an operation for rotating the first eccentric member; wherein the distance between the first abutting portion and the second abutting portion can be adjusted by rotation of the first eccentric member.

The mounting assistance device having the above-described aspect is used for mounting the assembly to an axle of a vehicle.

Firstly, the assembly is temporarily mounted to the axle of the vehicle with one of mounting nuts and wheel bolts. A distance between the first abutting portion of the first clamping member of the mounting assistance device and the second abutting portion of the second clamping member of the mounting assistance device is adjusted such that the first and the second abutting portions abut against sidewall portions of a tire. In this state, when the handle member is operated, the first eccentric member, which abuts against the first clamping member, is fixed to the second clamping member by the first lock mechanism.

Then, due to rotation of the first eccentric member, which is fixed at the second clamping member, by the operation of the handle, the distance between the first abutting portion and the second abutting portion is further contracted by an action of the first eccentric member which is, for example, an eccentric cam.

In this way, the mounting assistance device is tightened and fixed to the tire of the assembly and, even when vibration is applied to the assembly by the vibrating device, the mounting assistance device does not detach from the assembly. Thereafter, by gradual tightening of the one of mounting nuts and wheel bolts while the assembly is being vibrated, the wheel is mounted to the axle of the vehicle without the center of rotation of the wheel becoming eccentric with respect to the axle of the vehicle.

In accordance with the mounting assistance device based on the above-described aspect, the mounting assistance device can easily be mounted to the assembly simply by operation of the handle, without using a tool or the like. Accordingly, operating efficiency of a mounting operation is enhanced.

In a second aspect of the present invention, the first lock mechanism is formed as a second eccentric member, and by operation of the handle member in a first direction, the second eccentric member is rotated such that the first eccentric member and the second eccentric member are made integral and, by operation of the handle member in a second direction which is different from the first direction, the first eccentric member is rotated together with the second eccentric member.

According to the second aspect, since the handle member is provided with the second eccentric member, an operator can fix the first eccentric member to the second eccentric member (make the first eccentric member integral with the second eccentric member) and rotate the first eccentric member with the second eccentric member so as to reduce the distance between the first abutting portion and the second abutting portion, simply by operating the handle member in the first direction and the second direction. Accordingly, the operating efficiency of the mounting operation is further enhanced.

In a third aspect of the present invention, the mounting assistance device of the present invention further comprises a second lock mechanism to fix the first abutting portion and the second abutting portion such that a distance therebetween is constant.

In accordance with the third aspect, the mounting assistance device is fixed on the assembly by clamping the assembly with the first and second clamping members. Then, the clamped state (the distance between the first and the second abutting portions) is fixed by the second lock mechanism. Accordingly, the clamped state can be reliably maintained even when the vibrating device is driven.

DESCRIPTION OF THE PREFERRED EMBODIMENTS

A mounting assistance device relating to one embodiment of the present invention will be described.

Figure 1:
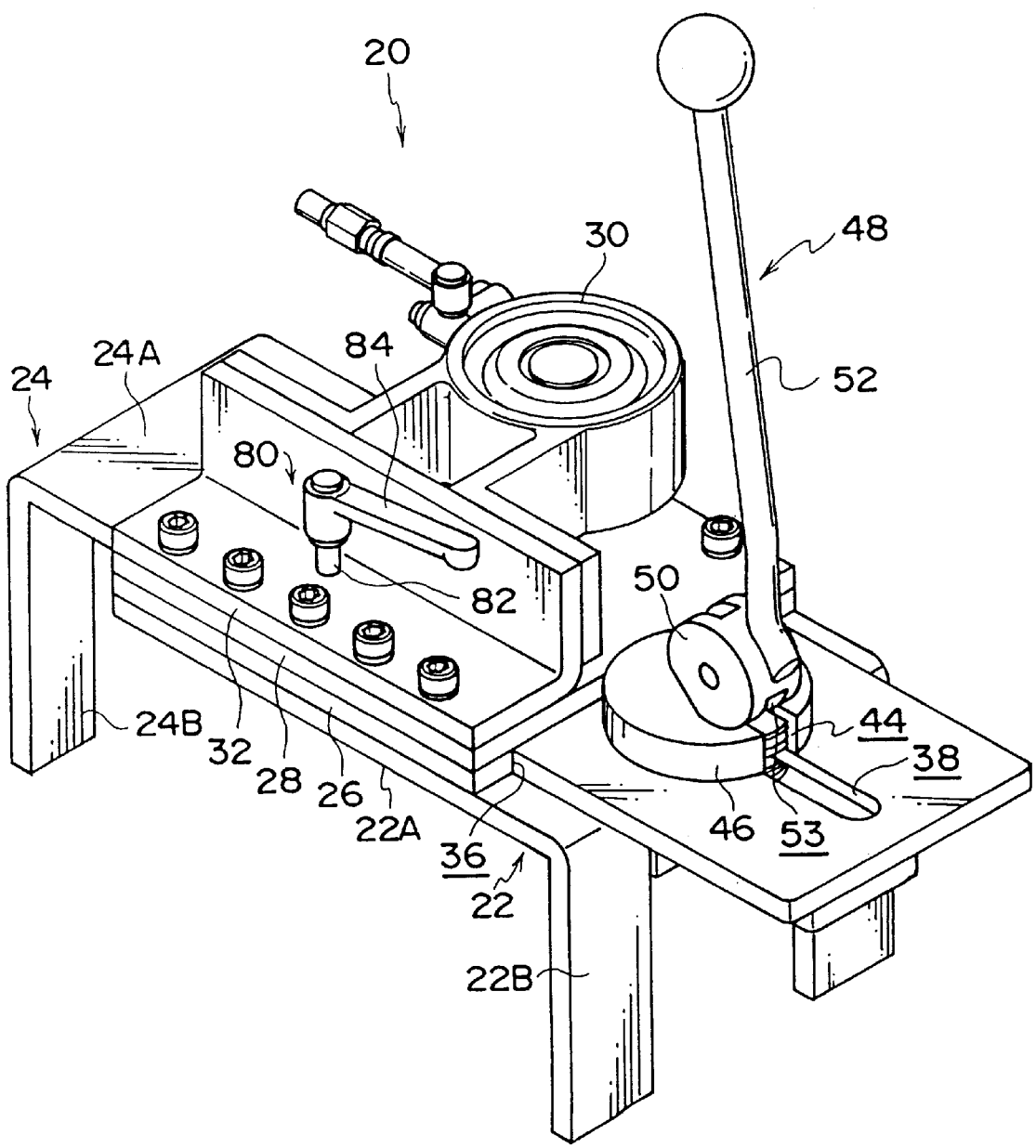
FIG. 1 is a perspective view of a mounting assistance device in accordance with one embodiment of the present invention.
Figure 2:
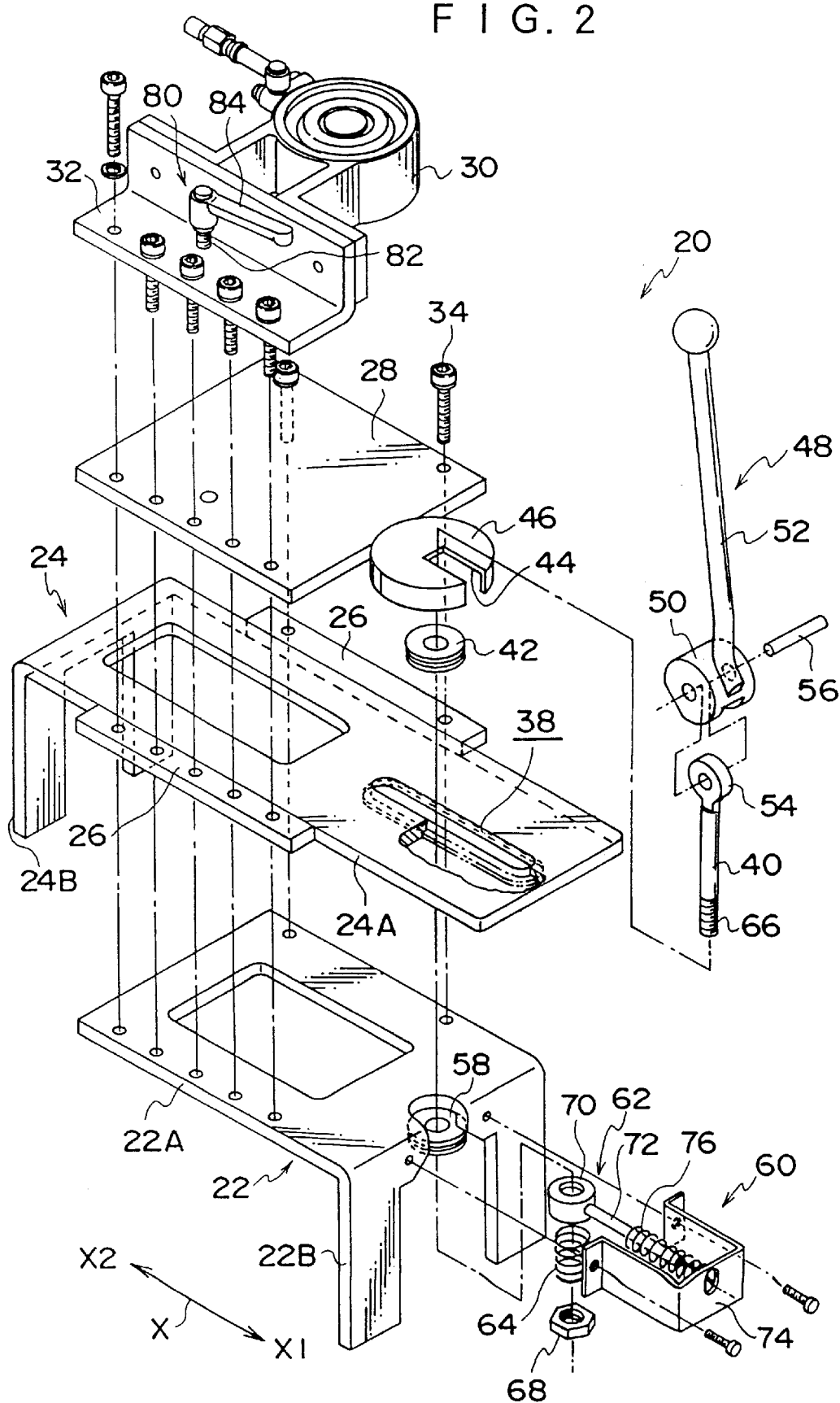
FIG. 2 is an exploded perspective view of the mounting assistance device in accordance with one embodiment of the present invention.

A mounting assistance device 20 has, as illustrated in FIGS. 1 and 2, a pair of clamping members 22 and 24. The clamping member 22 is formed in a substantially L-shaped configuration by a sliding portion 22A and an abutting portion 22B, which is formed continuously with and at a right angle to the sliding portion 22A. A protective member 22C for protecting a tire at a time of abutting against the tire is fixed at an inner side of the abutting portion 22B. The clamping member 24 is the same in these respects as the clamping member 22.

A pair of guide plates 26, a mounting plate 28, and an angle member 32 at which a vibrating device 30 is fixed are integrally fixed to the clamping member 22 by screws 34.

As a result, the sliding portion 24A of the clamping member 24 slides within a clearance portion 36 (see FIG. 4), which is formed by the clamping member 22 (sliding portion 22A), the guide plates 26, and the mounting plate 28, so as to adjust a distance between the abutting portions 22B and 24B.

An elongate hole 38 which extends along a sliding direction is formed at a sliding direction (a direction of arrow X1) end portion of the sliding portion 24A of the clamping member 24.

A pin member 40 passes through the elongate hole 38. The pin member 40 passes through, above the sliding portion 24A, a thrust bearing 42 and a center of rotation of an eccentric disc 46 which is rotatably supported by the thrust bearing 42 (the center of rotation of the eccentric disc 46 is offset from a center of the disc). Because of the above-described structure, the eccentric disc 46 can be eccentrically rotated about the pin member 40 at the sliding portion 24A in directions of arrows P.

Figure 3:
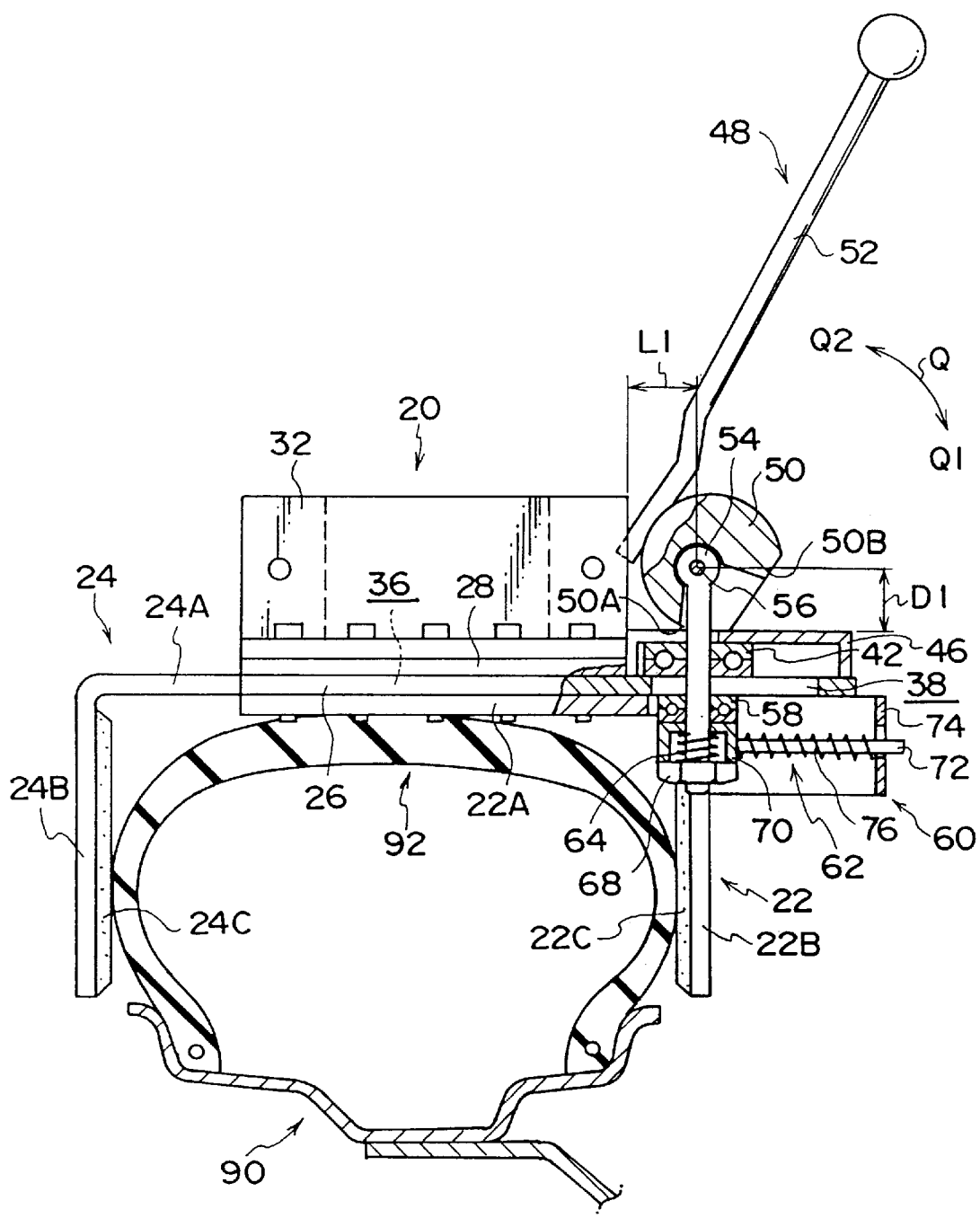
FIG. 3 is a cross-sectional view of the mounting assistance device in accordance with one embodiment of the present invention showing a state in which an eccentric portion and an eccentric plate are unlocked.

A handle member 48 is disposed at an upper portion of the eccentric disc 46. The handle member 48 is formed by an eccentric portion 50, which is a substantial cylinder with a portion of an outer circumferential surface thereof cut away, and a lever 52 which is fixed at the outer circumferential surface of the eccentric portion 50. A ring-shaped engaging portion 54 formed at a head portion of the pin member 40 is inserted into a cutout portion 53 formed at a central portion of the eccentric portion 50. A pin 56, which passes through a center of rotation of the eccentric portion 50, passes through the engaging portion 54. Accordingly, as illustrated in FIG. 3, the eccentric portion 50 can rotate about the pin 56 in directions of arrows Q.

Figure 4:
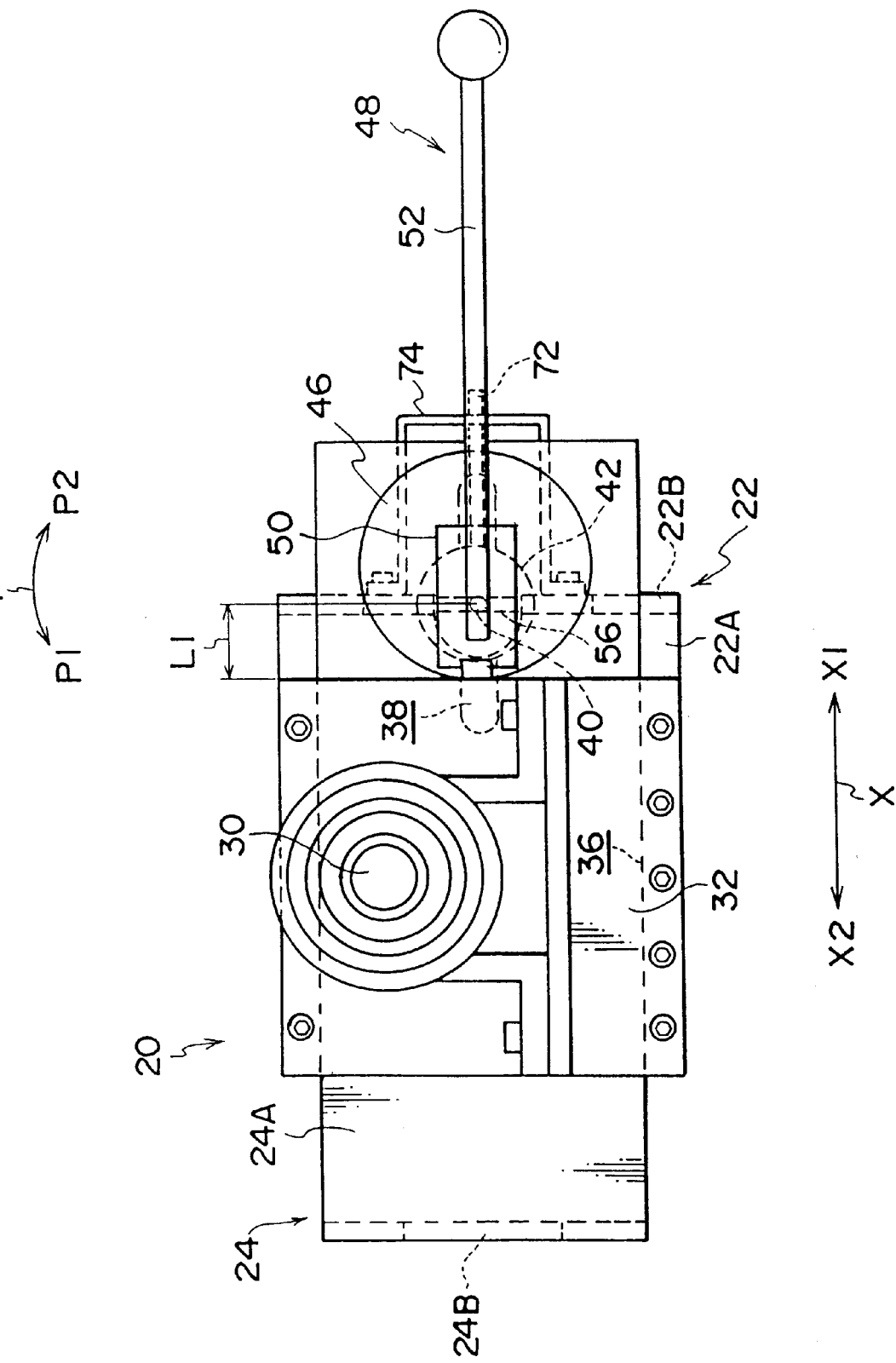
FIG. 4 is a plan view of the mounting assistance device in accordance with one embodiment of the present invention illustrating a state in which the eccentric portion and the eccentric plate are locked.

That is, the handle member 48 rotates about the pin member 40 in directions of arrows P, thereby rotating the eccentric disc 46 (see FIG. 4). The handle member 48 also rotates about the pin 56 in the directions of arrows Q, thereby rotating the eccentric portion 50 (see FIG. 3).

Under the sliding portion 24A, the pin member 40 passes through a thrust bearing 58, an engaging member 62 for an urging mechanism 60 which is described below, and a spring 64. A nut 68 is screwed onto a thread portion 66 which is formed at a distal end portion of the pin member 40.

The urging mechanism 60 is formed by a ring-shaped engaging portion 70 which forms the engaging member 62, a shaft portion 72 which is formed protruding from an outer circumferential surface of the engaging portion 70, a brace member 74 which is fixed at the abutting portion 22B and through which a distal end of the shaft portion 72 is inserted, and a spring 76 which is wound around the shaft portion 72 between the brace member 74 and the engaging portion 70. Accordingly, the spring 76 always presses the engaging portion 70 (the pin member 40) in the direction of arrow X2.

A shaft 82 of a lock member 80 is screwed into the angle member 32. A distal end of the shaft 82 can be pressed against the sliding portion 24A through a penetrating hole formed in the mounting plate 28, by rotation of a lever 84, such that the sliding portions 22A and 24A are prevented from sliding relative to each other. That is, the distance between the abutting portions 22B and 24B can be kept constant.

A method of mounting an assembly 90 to an axle of a vehicle using the mounting assistance device 20 which is structured as described above will be described hereinafter.

Firstly, a tire 92 is inflated to a predetermined internal pressure value. Then, with an appropriate balancer, the imbalance value of the assembly 90 is set zero or a value close to zero. The assembly 90 is then mounted with a suitable looseness with respect to a hub of the axle of the vehicle.

At this time, the lever 52 of the handle member 48 stands in a direction substantially perpendicular to the sliding portion 24A, as shown in FIG. 3, and a round outer circumferential surface 50A of the eccentric portion 50 abuts against the eccentric disc 46. Further, of the outer circumferential surface of the eccentric plate 46, a portion that is closest to the center of rotation of the eccentric plate 46 (at a distance L1 therefrom) abuts against an end portion of the mounting plate 28.

Then, the mounting assistance device 20, in which the distance between the abutting portions 22B and 24B has been widened so as to exceed a maximum width of the tire 92, is fitted onto the assembly 90 from thereabove (a tread side of the tire 92). One or both of the sliding portions 22A and 24A of the clamping members 22 and 24 are slid, thereby causing the protective members 22C and 24C of the abutting portions 22B and 24B to abut against sidewalls of the tire 92.

Because the brace member 74 moves in the direction of arrow X2 together with the clamping member 22 (the abutting portion 22B), the spring 76 of the urging mechanism 60 is compressed and the pin member 40 (the eccentric disc 46) is pressed in the direction of arrow X2 by the elastic force of the spring 76. Accordingly, the mounting plate 28 also moves in the direction of arrow X2 together with the clamping member 22. The eccentric disc 46 follows the mounting plate 28 in the direction of arrow X2 and the abutting state of the eccentric disc 46 against the mounting plate 28 is maintained.

Figure 5:
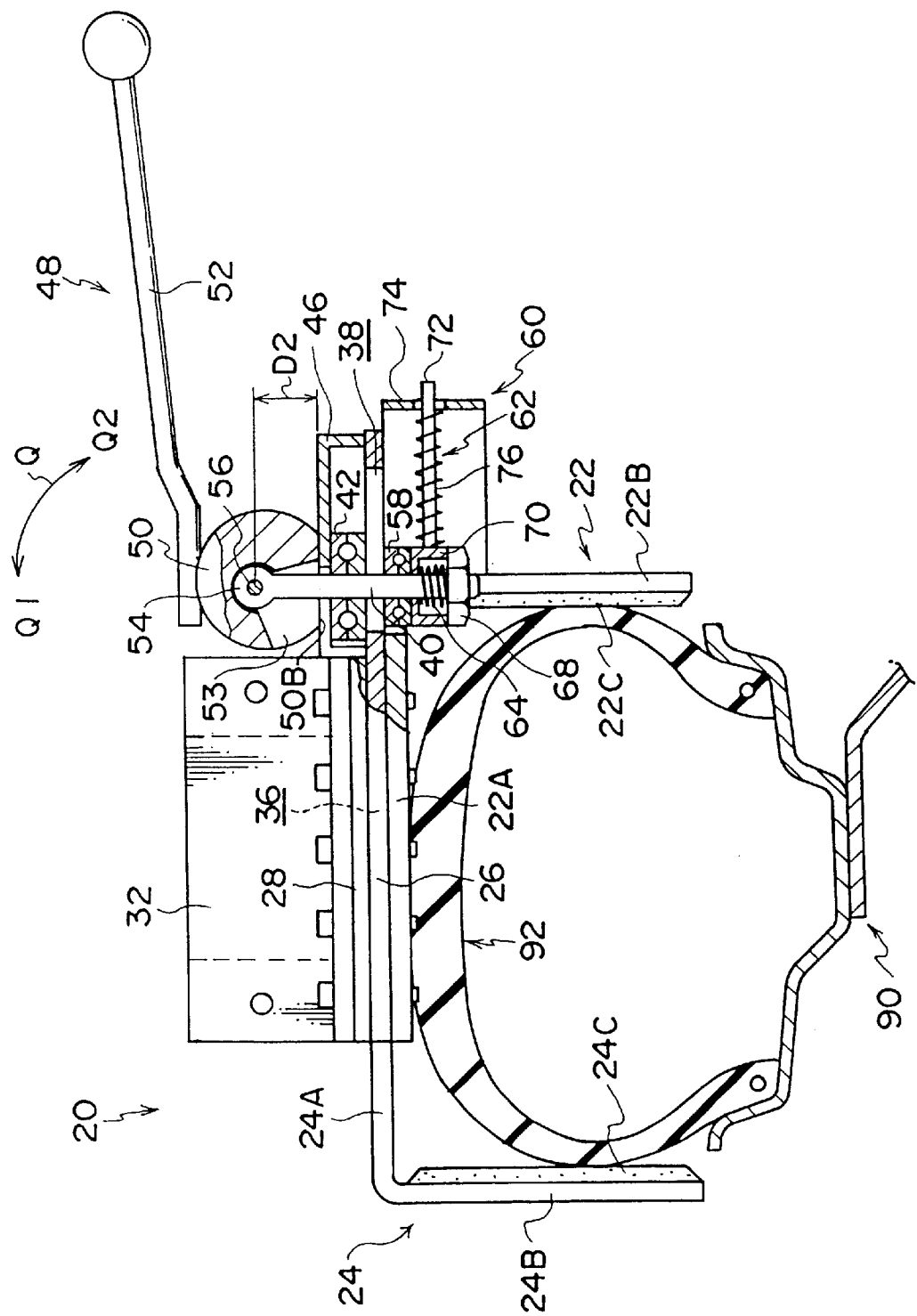
FIG. 5 is a cross-sectional view of the mounting assistance device in accordance with one embodiment of the present invention illustrating a state in which the eccentric portion and the eccentric plate are locked.
Figure 6:
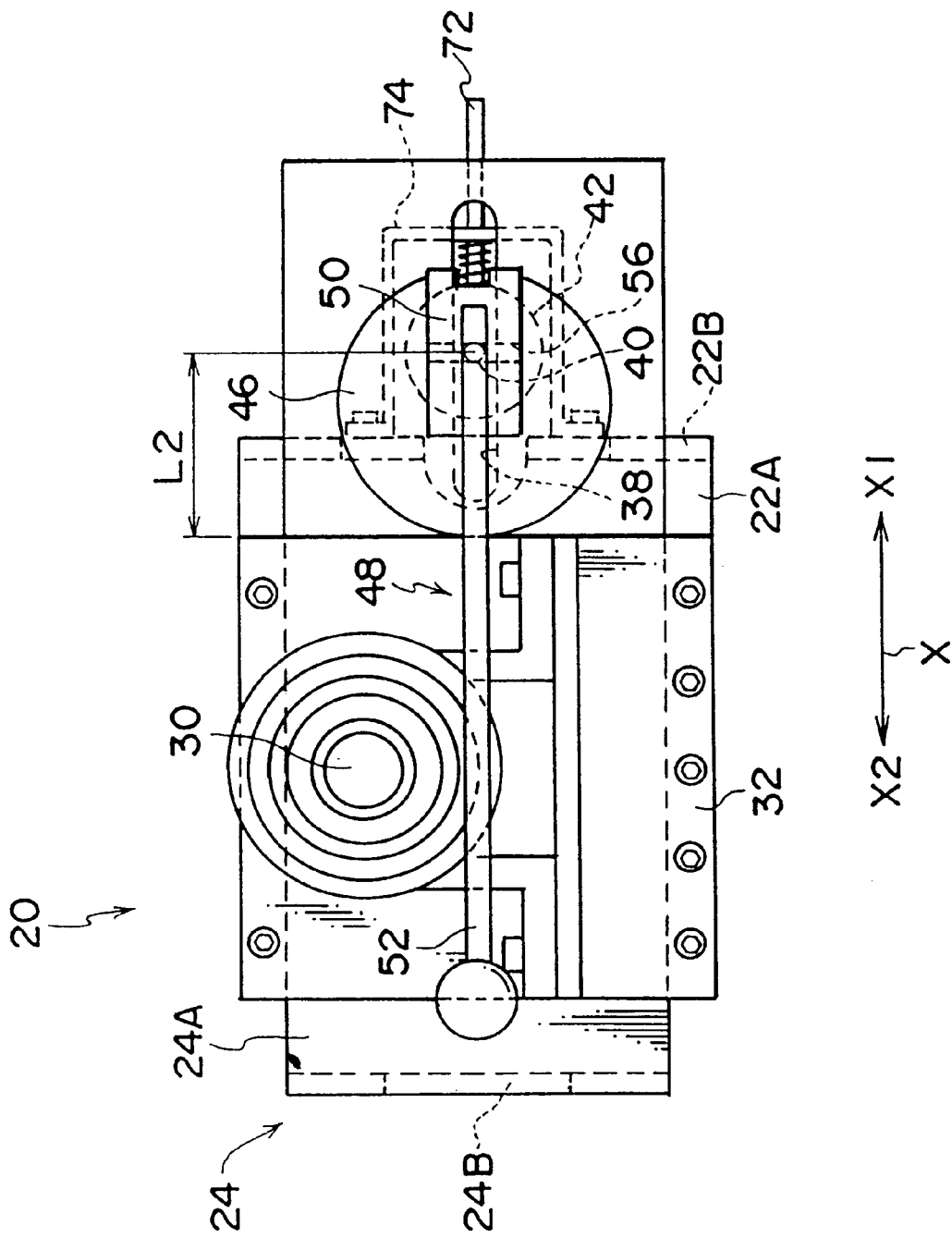
FIG. 6 is a plan view of the mounting assistance device in accordance with one embodiment of the present invention illustrating a state in which a distance between abutting portions has contracted so as to clamp a tire.
Figure 7:
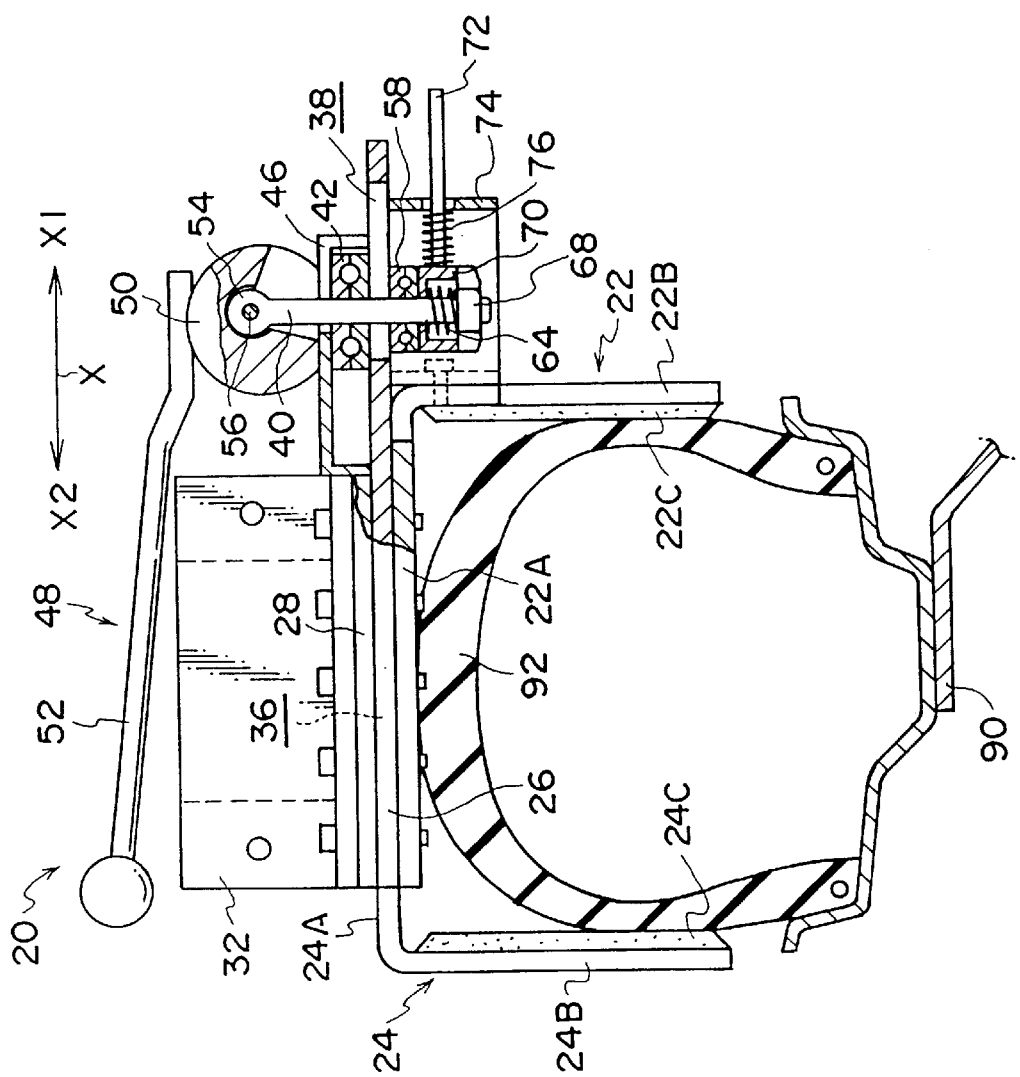
FIG. 7 is a cross-sectional view of the mounting assistance device in accordance with one embodiment of the present invention illustrating a state in which a distance between abutting portions has contracted so as to clamp a tire.
Figure 8:
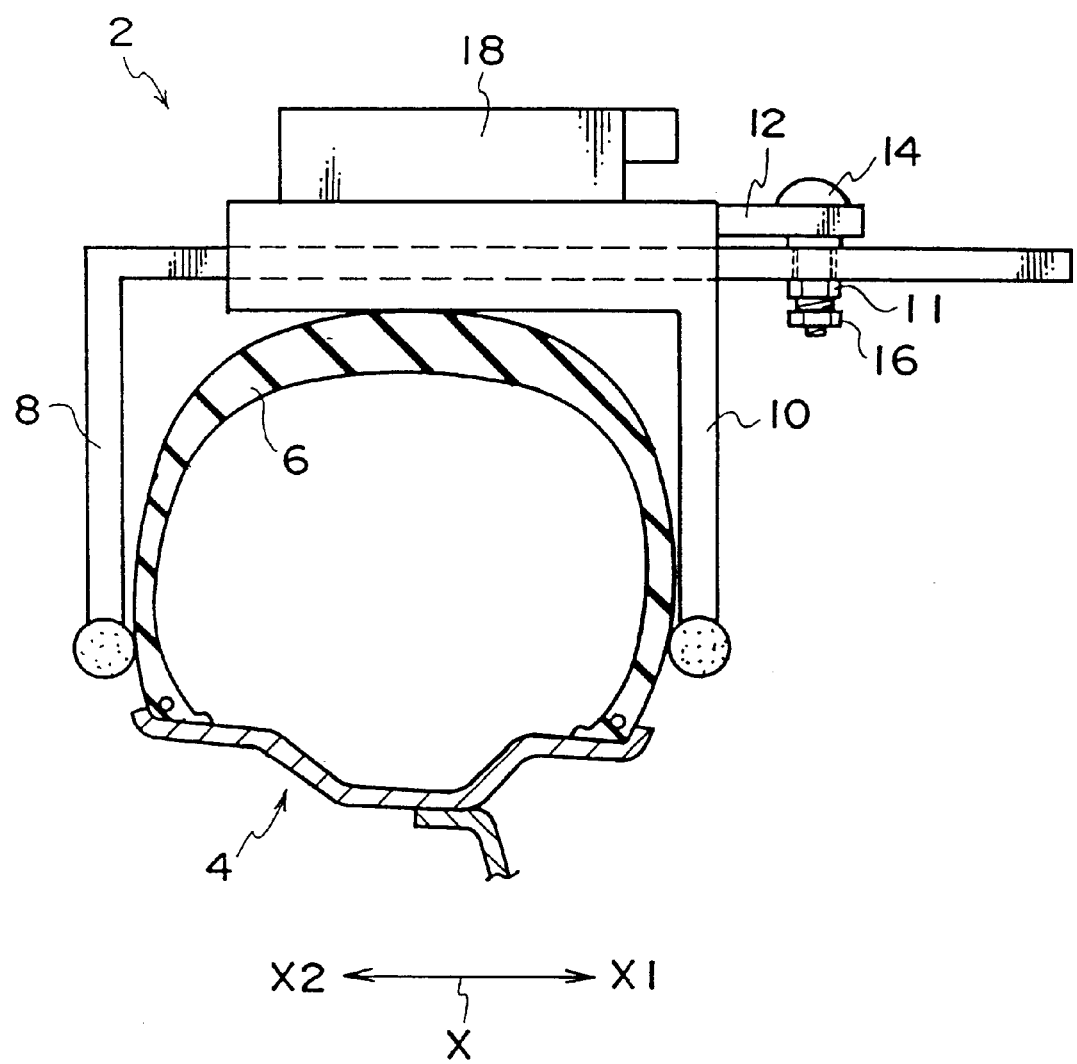
FIG. 8 is a side view of a conventional mounting assistance device.

In this state, when the lever 52 is rotated about the pin 56 in the direction of arrow Q1, a flat surface portion 50B of the eccentric portion 50 abuts against the eccentric disc 46 (see FIG. 3 and FIG. 5). As a result, a distance from an upper surface of the eccentric disc 46 to the pin 56 is increased (from a distance D1 in FIG. 3 to a distance D2 in FIG. 5 because the eccentric portion 50 is structured such that D2 >D1).

At this point, because a distance from the pin 56 to the nut 68 is constant, the thrust bearing 42 presses against the sliding portion 24A. As a result, the pin member 40 can no longer move along the elongate hole 38 (the pin member 40 is fixed with respect to the sliding portion 24A). However, because the load applied on the eccentric disc 46 is supported by the thrust bearing 42, the eccentric disc 46 is rotatable.

In this state, the flat surface portion 50B of the eccentric portion 50 presses against the eccentric disc 46. Thus, the eccentric portion 50 moves integrally with the eccentric disc 46.

Then, the lever 52 is rotated substantially 180° about the pin member 40 in the direction of arrow P1 (see FIGS. 4 and 5, and FIGS. 6 and 7). Of the outer circumferential surface of the eccentric disc 46, a portion that is farthest to the center of rotation of the eccentric disc 46 (at a distance L2 therefrom) abuts against the mounting plate 28. As a result, the clamping member 22 is moved at a distance of (L2–L1) in the direction of arrow X2 relative to the clamping member 24. Accordingly, the distance between the abutting portions 22B and 24B is reduced such that the tire 92 can be tightly clamped. Further, when the lever 84 of the lock member 80 is rotated, the distal end of the shaft 82 presses the mounting plate 28 such that the sliding portion 22A and the sliding portion 24A are fixed to each other.

In the present embodiment, the lever 52 is rotated substantially 180° about the pin member 40 in the direction of arrow P1. However, it should be understood that the degree of rotation of the lever 52 is not necessarily limited to 180°. As long as the clamping member 22 is moved at a sufficient distance in the direction of X2 relative to the clamping member 24, the shape of eccentric disc 46 and the degree of rotation of the lever 52 required for an effective rotation of the eccentric disc 46 may be changed as desired.

In this way, the mounting assistance device 20 is fixed to the assembly 90. Then, the vibrating device 30 is driven to vibrate the assembly 90. While the assembly 90 is vibrating, a plurality of mounting nuts are successively tightened up little by little (in any order). When the mounting nuts have been tightened up, the center of rotation of the assembly 90 is accurately aligned in a straight line with an axial center of the vehicle.

When the mounting assistance device 20 is removed from the assembly 90, the following operations are carried out: the lever 84 of the lock member 80 is rotated to an unlocked state; the lever 52 is rotated about the pin member 40 in the direction of arrow P2 so as to turn the eccentric disc 46 back; the lever 52 is rotated about the pin 56 in the direction of arrow Q2 to be raised, and thus locking of the eccentric disc 46 with respect to the sliding portion 24A is released; and the abutting portions 22B and 24B are moved away from each other so as to be spaced from the sidewall portions of the tire 92. Then, the mounting assistance device 20 can be removed from the tire 92.

Hence, for mounting the mounting assistance device 20 of the present embodiment to the assembly 90, simple operation of the handle member 48 suffices and there are no operations for which a tool is needed, such as tightening of nuts. Accordingly, mounting operation efficiency is enhanced. The handle member 48 is uniquely rotatable in two directions of rotation. Thus, fixing of the eccentric disc 46 with respect to the sliding portion 24A and rotation of the eccentric disc 46 can be carried out by operation of the single handle member 48.

Further, the mounting plate 28 is pressed against the sliding portion 24A simply by rotation of the lever 84 of the lock member 80 and clamping of the abutting portions 22B and 24B with respect to the assembly 90 can be reliably maintained.

In the present embodiment, the handle member 48 and the lock member 80 are provided in lever form. However, these members can have any form that is easily operated such that cumbersome operations using tools are not required.

What is claimed is:

1. A mounting assistance device which clamps a tire-and-wheel assembly from both side surfaces thereof and vibrates the assembly, comprising:

a first clamping member and a second clamping member for clamping the both side surfaces of said assembly;

a first abutting portion and a second abutting portion which are portions of said first clamping member and said second clamping member respectively, and which abut against the side surfaces of said assembly, and which face each other with a distance therebetween which can be adjusted;

a vibrating device which is fixed to one of said first clamping member and said second clamping member;

a first eccentric member which is rotatably disposed at the second clamping member so as to abut against the first clamping member and is urged onto the first clamping member such that the first eccentric member moves integrally with the first clamping member;

a first lock mechanism for fixing said first eccentric member to the second clamping member; and a handle member which enables an operation for fixing the first eccentric member to the second clamping member via the first lock mechanism, and enables an operation for rotating the first eccentric member;

wherein the distance between said first abutting portion and said second abutting portion can be adjusted by rotation of said first eccentric member.

2. A mounting assistance device according to claim 1, wherein said first lock mechanism is formed as a second eccentric member, and by operation of said handle member in a first direction, said second eccentric member is rotated such that said first eccentric member and said second eccentric member are made integral and, by operation of said handle member in a second direction which is different from said first direction, said first eccentric member is rotated together with said second eccentric member.

3. A mounting assistance device according to claim 2, further comprising a second lock mechanism to fix said first abutting portion and said second abutting portion such that a distance therebetween is constant.

4. A mounting assistance device according to claim 3, wherein said first clamping member includes a first sliding portion which extends substantially horizontally above a tread portion of said assembly and said first abutting portion, and which extends substantially vertically downward from the first sliding portion to abut against one side surface of said assembly, and said second clamping member includes a second sliding portion which extends substantially horizontally above the tread portion of said assembly and said second abutting portion, which extends substantially vertically downward from the second sliding portion to abut against another side surface of said assembly.

5. A mounting assistance device according to claim 4, wherein one of the first and second sliding portions is relatively slidable with respect to another of the first and second sliding portions.

6. A mounting assistance device according to claim 5, wherein said first clamping member further includes a mounting plate which is provided integral with said first sliding portion so as to be parallel to said first sliding portion and constantly spaced from said first sliding portion, and said second sliding portion is slidable at a space between said first sliding portion and said mounting plate.

7. A mounting assistance device according to claim 6, wherein said vibrating device is disposed on said mounting plate.

8. A mounting assistance device according to claim 7, wherein when the second eccentric member, which is said first lock mechanism, and said first eccentric member are made integral by the operation of said handle member in said first direction and then said first eccentric member is rotated interlockingly with said second eccentric member by the operation of said handle member in said second direction, a distance from a center of rotation of said first eccentric member to an abutting point of said first eccentric member and said mounting plate is changed, and therefore said mounting plate and said first clamping member slide relatively with respect to said second clamping member and the distance between said first abutting portion and said second abutting portion is adjusted.

9. A mounting assistance device according to claim 8, wherein said first eccentric member is an eccentric cam.

10. A mounting assistance device according to claim 9, wherein a load applied on said first eccentric member is supported by a thrust bearing and therefore, even when said first eccentric member has been made integral with said second eccentric member which is said first lock mechanism by the operation of said handle member in said first direction, said first eccentric member is rotatable in said second direction.

11. A mounting assistance device according to claim 3, wherein said second lock mechanism maintains a constant distance between said first abutting portion and said second abutting portion by preventing sliding of said first sliding portion and said second sliding portion.

12. A mounting assistance device which clamps a tire and wheel assembly from both side surfaces thereof and vibrates the assembly, comprising:

a first clamping member and a second clamping member for clamping the both side surfaces of said assembly;

said first clamping member comprising:
a first sliding portion which extends substantially horizontally above a tread portion of said assembly;
a first abutting portion which extends substantially vertically downward from the first sliding portion to abut against one side surface of said assembly; and
a mounting plate which is integrally provided above said first sliding portion so as to be parallel to said first sliding portion and constantly spaced from said first sliding portion;

said second clamping member comprising:
a second sliding portion which extends substantially horizontally above the tread portion of said assembly; and
a second abutting portion which extends substantially vertically downwards from the second sliding portion to abut against another side surface of said assembly;
wherein said second sliding portion is slidably disposed between said first sliding portion and said mounting plate; and said mounting assistance device further comprising:
an eccentric mechanism which is provided on said second sliding portion so as to abut against said mounting plate, is urged onto the second clamping member such that the eccentric member moves integrally with the second clamping member, and is rotatable about an axis which is perpendicular to the first and second sliding portions;

a vibrating device fixed on said mounting plate;

wherein said eccentric mechanism can be locked to said second sliding portion and united with said second sliding portion.

13. A mounting assistance device according to claim 12, wherein said eccentric mechanism is locked to said second sliding portion and made integral with said second sliding portion by a first operation, said eccentric mechanism is rotatable about the axial when in a state of being integral with said second sliding portion, a distance from a center of rotation of said eccentric mechanism to an abutting point of said eccentric mechanism and said mounting plate is then changed by rotation of said eccentric mechanism about the axial direction by a second operation, and therefore said mounting plate and said first clamping member slide relatively with respect to said second clamping member and a distance between said first abutting portion and said second abutting portion is adjusted.

14. A mounting assistance device according to claim 13, wherein said eccentric mechanism is pressed against said first clamping member by an urging means so as to be prevented from separating from said first clamping member.

15. A mounting assistance device according to claim 14, wherein said eccentric mechanism further comprises:

a first lock mechanism which fixes said first eccentric member to the second sliding portion; and a handle member for enabling said first and said second operations.

16. A mounting assistance device according to claim 15, wherein said first eccentric member is an eccentric cam.

17. A mounting assistance device according to claim 16, wherein a load applied on said first eccentric member is supported by a thrust bearing and therefore, even when said first eccentric member has been made integral with said first lock mechanism by said first handle operation, said first eccentric member can be rotated by said second handle operation.

18. A mounting assistance device according to claim 12, further comprising a second lock mechanism which maintains a constant distance between said first abutting portion and said second abutting portion by preventing sliding of said first and second sliding portions.

* * * * *